United States Patent
McEwan

(10) Patent No.: US 6,426,716 B1
(45) Date of Patent: Jul. 30, 2002

(54) MODULATED PULSE DOPPLER SENSOR

(75) Inventor: Thomas E. McEwan, Carmel Highlands, CA (US)

(73) Assignee: McEwan Technologies, LLC, Monterey, CA (US)

( * ) Notice: Subject to any disclaimer, the term of this patent is extended or adjusted under 35 U.S.C. 154(b) by 0 days.

(21) Appl. No.: 09/794,268

(22) Filed: Feb. 27, 2001

(51) Int. Cl.$^7$ .......................... G01S 13/04; G01S 13/56
(52) U.S. Cl. .......................... 342/28; 342/27; 342/89; 342/91; 342/93; 455/46; 455/47; 329/311; 329/313; 329/347; 329/356; 329/357
(58) Field of Search .......................... 375/239; 342/27, 342/28, 118, 134–144, 192–197, 89–103, 82–88; 455/46, 47; 329/311, 313, 347, 356, 357

(56) References Cited

U.S. PATENT DOCUMENTS

| | | | |
|---|---|---|---|
| 3,538,507 A | * 11/1970 | Wiley, Jr. | 342/88 |
| 3,757,327 A | * 9/1973 | Wiley, Jr. | 342/82 |
| 3,978,481 A | 8/1976 | Angwin et al. | |
| 4,219,812 A | 8/1980 | Rittenbach | |
| 4,222,049 A | 9/1980 | Sirven et al. | |
| 4,540,978 A | 9/1985 | Burns et al. | |
| 4,697,184 A | 9/1987 | Cheal et al. | 342/28 |
| 4,709,237 A | 11/1987 | Poullain et al. | 342/203 |
| 4,743,906 A | 5/1988 | Fullerton | 342/27 |
| 4,768,207 A | * 8/1988 | Sejourne et al. | 375/239 |
| 4,782,343 A | 11/1988 | Marchais | 342/160 |
| 4,952,939 A | 8/1990 | Seed | 342/27 |
| 5,191,347 A | 3/1993 | Ishikawa et al. | 342/132 |
| 5,361,070 A | 11/1994 | McEwan | 342/21 |
| 5,512,834 A | 4/1996 | McEwan | |
| 5,521,600 A | 5/1996 | McEwan | 342/27 |
| 5,682,164 A | 10/1997 | McEwan | 342/27 |
| 5,966,090 A | 10/1999 | McEwan | 342/27 |

FOREIGN PATENT DOCUMENTS

| | | | | |
|---|---|---|---|---|
| GB | 2218294 A | * | 11/1989 | G01S/13/18 |
| JP | 8-5732 A | * | 1/1996 | G01S/13/12 |

* cited by examiner

Primary Examiner—Bernarr E. Gregory
(74) Attorney, Agent, or Firm—Mark A. Haynes; Haynes Beffel & Wolfeld LLP

(57) ABSTRACT

A range gated microwave motion sensor having adjustable minimum and maximum detection ranges with little response to close-in false alarm nuisances such as insects or vibrating panels. The sensor resolves direction of motion and can respond to target displacement in a selected direction and through a selected distance, in contrast to conventional hair-trigger motion sensors. A constant false alarm rate (CFAR) detector prevents false triggers from fluttering leaves, vibrating machinery, and RF interference. The sensor transmits an RF pulse and, after a modulated delay, mixes echo pulses with a mixer pulse. Thus, the echo pulses are modulated at the mixer output while transmit and mixer pulse artifacts remain unmodulated and easily filtered from the output. Accordingly, the sensor only responds to echoes that fall within its minimum and maximum range-gated region, and not to close-in or far-out objects. Applications for the low-cost system include indoor and outdoor burglar alarms, automotive security alarms, home and industrial automation, robotics, vehicle proximity sensors, cardiac motion detection, and a universal radar "bubble" detector.

28 Claims, 7 Drawing Sheets

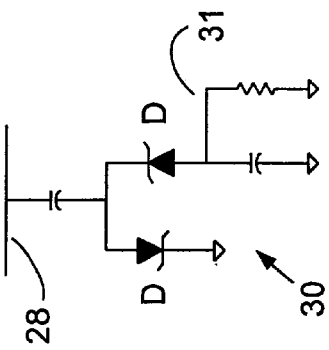
FIG. 2C
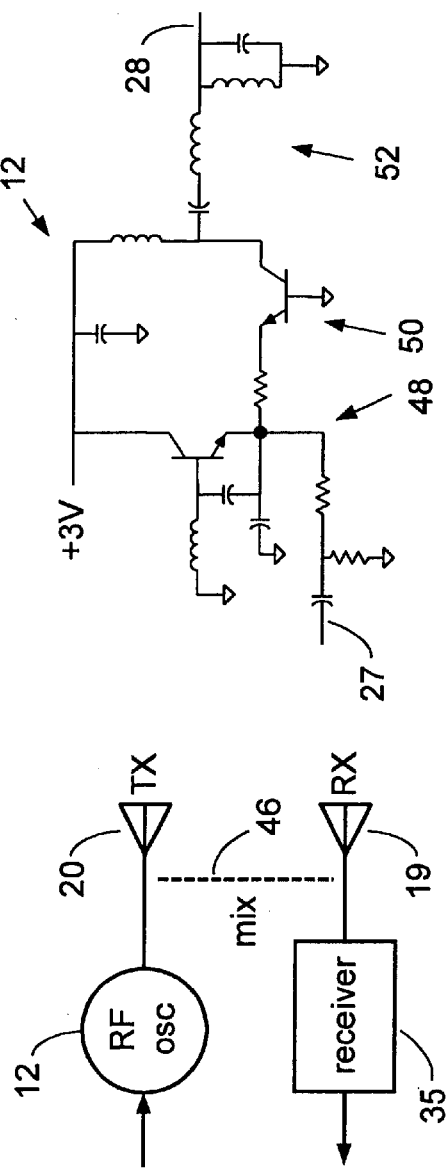
FIG. 2B
FIG. 2A
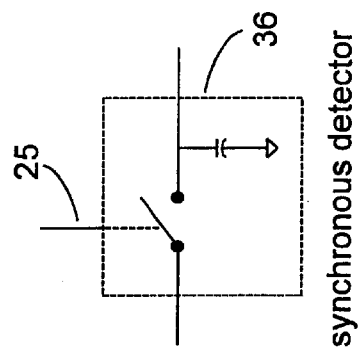
FIG. 2D

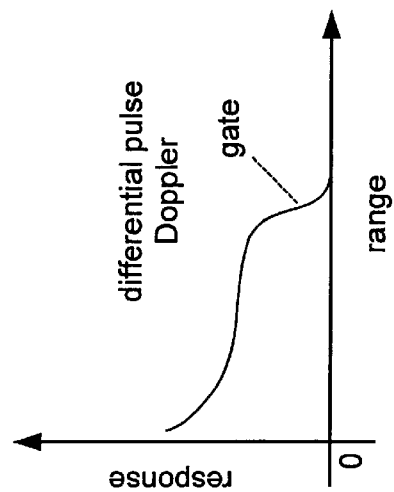
FIG. 3A (prior art)
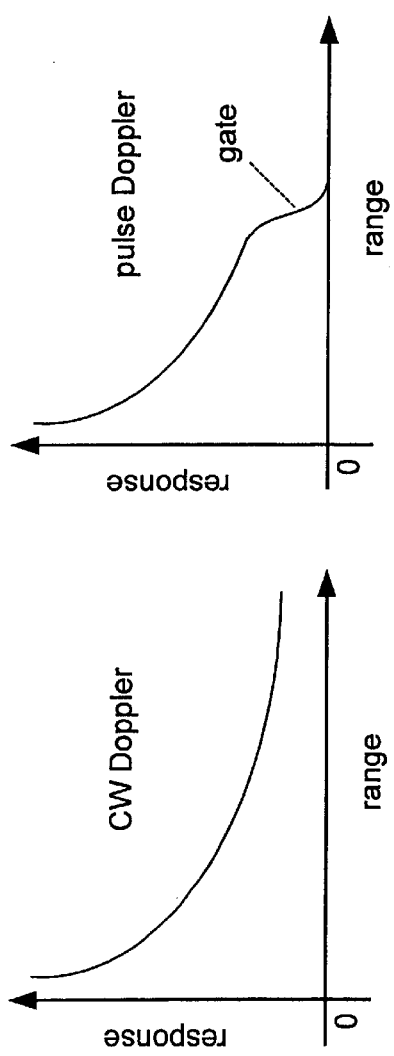
FIG. 3B (prior art)
FIG. 3C (prior art)
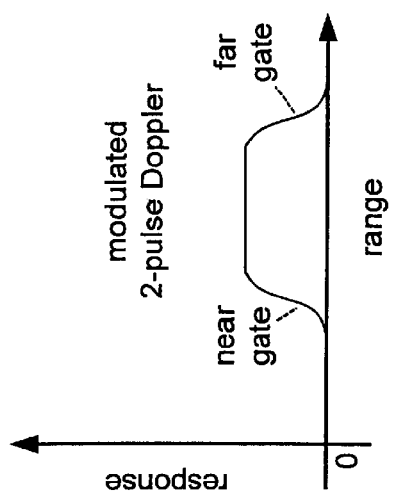
FIG. 3D (prior art)
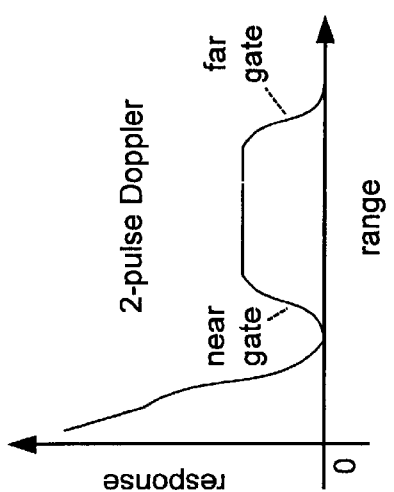
FIG. 3E (prior art)
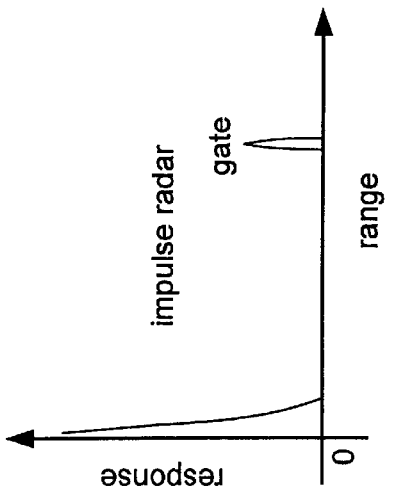
FIG. 3F

MODULATED PULSE DOPPLER SENSOR

BACKGROUND OF THE INVENTION

1. Field of the Invention

The present invention relates to radar motion sensing, and more particularly to pulse-Doppler radar motion sensors.

2. Description of Related Art

CW Doppler radar motion sensors emit a continuous wave carrier and mix the transmitted RF with the return echoes to produce a difference frequency equal to the Doppler shift produced by a moving target. CW Doppler sensors have a number of serious deficiencies that limit their widespread application: 1) lack of a definite range limit, which leads to false triggers on distant clutter 2) extremely high sensitivity at close range, causing false triggering on nearby insects or vibrating objects, 3) high current consumption due to CW operation, making battery operation impractical, and 4) inability to collocate non-channelized sensors due to mutual interference.

A pulse Doppler motion sensor was described in U.S. Pat. No. 4,197,537 to Follen et al. and similar devices are described elsewhere. A short pulse is transmitted and its echo is self-mixed with the transmitted pulse so the pulse width defines the range-gated region. When the transmit pulse ends, mixing ends and target returns arriving after the end of the transmit pulse don't get mixed and are thereby gated out. With 100% amplitude modulation, response beyond the maximum range is zero-there is no leakage. While pulse Doppler exhibits. excellent range gating characteristics, its voltage response versus range varies with $1/R^2$, where R=range to target. This $1/R^2$ characteristic occurs with CW Doppler as well (see FIGS. 3A, 3B and 7A). Thus, a large target at 10 meters range and an insect a 1 cm range may produce the same response.

A Differential pulse Doppler motion sensor disclosed in U.S. Pat. No. 5,966,090, "Differential Pulse Radar Motion Sensor," to McEwan, alternately transmits two pulse widths and subtracts the Doppler responses from each width to produce a range gated Doppler sensing region having a fairly constant response versus range (see FIGS. 3C and 7B). Unfortunately, the response at very close range, while much improved over CW Doppler, increases more than can be tolerated for some applications, such as an outdoor security alarm where insects, birds, or hail may falsely trigger the sensor.

Impulse radar, such as that described in U.S. Pat. No. 5,361,070, "Ultra-Wideband Radar Motion Sensor," to McEwan produces a very narrow sensing region that is related to the transmitted impulse width (see FIG. 3D). The narrow sensing region defines a thin spherical "bubble" about the radar. Unfortunately, most motion sensor applications require a "volume fill", i.e., a filled zone or range span, and not just a thin shell that might be pierced without detection by a fast-moving burglar. Impulse radars also suffer from the same flaw seen in all prior radar motion sensors: the gate or mixer pulse radiates and can be reflected back by a close-in target to create an excessively high response to close-in objects. This problem might be called "close-in homodyning." An impulse radar operates with very short pulses, so one might expect the close-in homodyning region to be very small, perhaps having a radius of only 1 cm. However, antenna ringing in practical antennas can stretch the close-in homodyning region to several feet. Impulse radar operation is currently prohibited in the U.S. and globally.

A two-pulse Doppler radar motion sensor, as first described in U.S. Pat. No. 5,682,164, "Pulse Homodyne Field Disturbance Sensor," to McEwan, transmits a first pulse and after a delay generates a second pulse that mixes with echoes from the first pulse. Thus a range gated sensing band, or thick shell, is formed with defined minimum and maximum ranges (see FIG. 3E). This is a nearly ideal motion sensing response, since both the minimum and maximum range are readily adjustable and a volume fill is provided. Unfortunately, there is a close-in homodyning response due to self-mixing of radiated and reflected components of the individual first and the second pulses.

Clearly, there is a need for improvement if radar motion sensors are to find their way into widespread use where close-in false targets are common. The modulated pulse Doppler motion sensor of the present invention resolves these prior limitations.

SUMMARY OF THE INVENTION

The present invention generates repeated sets of two pulses: a transmit pulse and a mixer pulse, with a modulated interval between the two pulses. (As used herein in the context of RF circuits and techniques, a "pulse" is typically a burst of multiple RF cycles.) The mixer pulse is timed to coincide with echo pulses reflected from a desired range gated region. The timing of the mixer pulse relative to the transmitted pulse is modulated, while the timing of the echo pulse is fixed by the target range, so the phase of the echo relative to the mixer pulse is modulated, which induces amplitude modulation on the mixer output. Thus, the echo pulse is amplitude modulated at the mixer output while mixer outputs from the transmitted and mixer pulses resulting from self-mixing are not modulated. The modulated output is filtered from the unmodulated components so the radar detects only the distant echo returns and filters out the close-in returns that result from self-mixing. There is no sensitivity at close-in range-a very desirable feature, and unlike the prior art.

The apparatus includes an RF oscillator with associated pulse generating and delay elements to produce the transmit and mixer pulses, a single transmit (TX)/receive (RX) antenna or a pair of separate TX and RX antennas, and an RF receiver, including a detector/mixer with associated filtering, amplifying and demodulating elements to produce a range gated Doppler signal from the mixer and echo pulses.

A further aspect of the invention includes a quadrature RF receiver and single sideband (SSB) Doppler processing. Accordingly, an upper sideband channel (USB) responds to inbound objects, while a lower sideband channel (LSB) responds to outbound objects. Doppler signals in each channel are rectified and averaged prior to threshold detection. The amount of averaging determines how far an object must move before detection. This can be termed one-way "displacement" sensing, rather than motion sensing. Displacement sensing is far more robust than hair-trigger Doppler motion sensing.

A threshold detector is connected to the upper sideband channel for inbound displacement sensing. Its threshold is set in part by signals from the opposite, or outbound channel, which forms a constant false alarm rate (CFAR) configuration. Any noise appearing in both channels will increase the CFAR detector threshold. Common channel noise may result from vibrating objects, buzzing insects, fluttering leaves, or RF interference—in short, all the usual false trigger sources. With the CFAR configuration, only an object that has moved through a predefined distance in one direction, usually inbound, will trigger the CFAR detector and subsequent processor/alarm.

A primary object of the present invention is to provide a sensor with a Doppler response within a range-limited region and no response outside that region.

Another object of the present invention is to provide a spread-spectrum microwave motion sensor that can be collocated with other spectrum users without having to set a specific operating frequency.

Yet another object of the invention is to provide a motion sensor with reduced power consumption, high rejection of power supply variations and low 1/F noise in the receiver.

A further object of the invention is to provide a motion sensor with the above-cited features and direction sensing capability, and further incorporating a novel CFAR detector.

Another object of the invention is to provide a motion sensor with the above-cited features and multiple range-cell operation.

Yet another object of the invention is to provide a motion sensor with improved clutter rejection for near surfaces such as the chest wall, for cardiac motion sensing.

The present invention is a cost-effective, low power, and long lasting electronic sensor that is impervious to harsh environmental conditions such as dirt, rain, snow, acoustic noise, external thermal effects, and sunlight. Furthermore, the sensor of the present invention may use frequencies that can penetrate certain materials (without damaging the material) to allow installation behind plastic panels or wood or concrete walls.

Uses for the present invention include indoor and outdoor security alarms, home automation and lighting control, industrial and robotic controls, automatic toilet and faucet control, automatic door openers, vehicle backup warning and collision detection, and general appliance control.

The Doppler passband of the present invention can be set to pass audio and higher frequencies making it responsive to vibrations. As a vibration sensor, the present invention can be used for industrial applications such as wheel and fan blade balancing. It can also be used for shaft vibration sensing, loudspeaker sensing and control, guitar string and musical instrument pickup, and vocal cord vibration sensing. Other applications include RF identification and innumerable other applications involving active reflectors, often employing SSB radar operation, as detailed in U.S. patent application Ser. No. 09/388.785, "SSB Pulse Doppler Sensor and Active Reflector System," by McEwan.

In another embodiment of the present invention, body organ motion can be detected and monitored, including cardiac motion, arterial pulse, vocal cord and tongue motion.

BRIEF DESCRIPTION OF THE DRAWINGS

FIG. 2A depicts a two antenna configuration for the radar of FIG. 1.

FIG. 2B is a schematic of an exemplary RF transmitter of the, present invention.

FIG. 2C is a schematic of an exemplary RF peak-to-peak detecting mixer of the present invention.

FIG. 2D is a schematic of an exemplary synchronous detector of the present invention.

FIGS. 3A–E plot response versus range for various prior art radar motion sensors.

FIG. 3F plots response versus range for the present invention.

DETAILED DESCRIPTION OF THE INVENTION

A detailed description of the present invention is provided below with reference to the Figures. While illustrative component values and circuit parameters are given, other embodiments can be constructed with other component values and circuit parameters. All U.S. Patents and copending U.S. applications cited herein are herein incorporated by reference.

Figure 1:
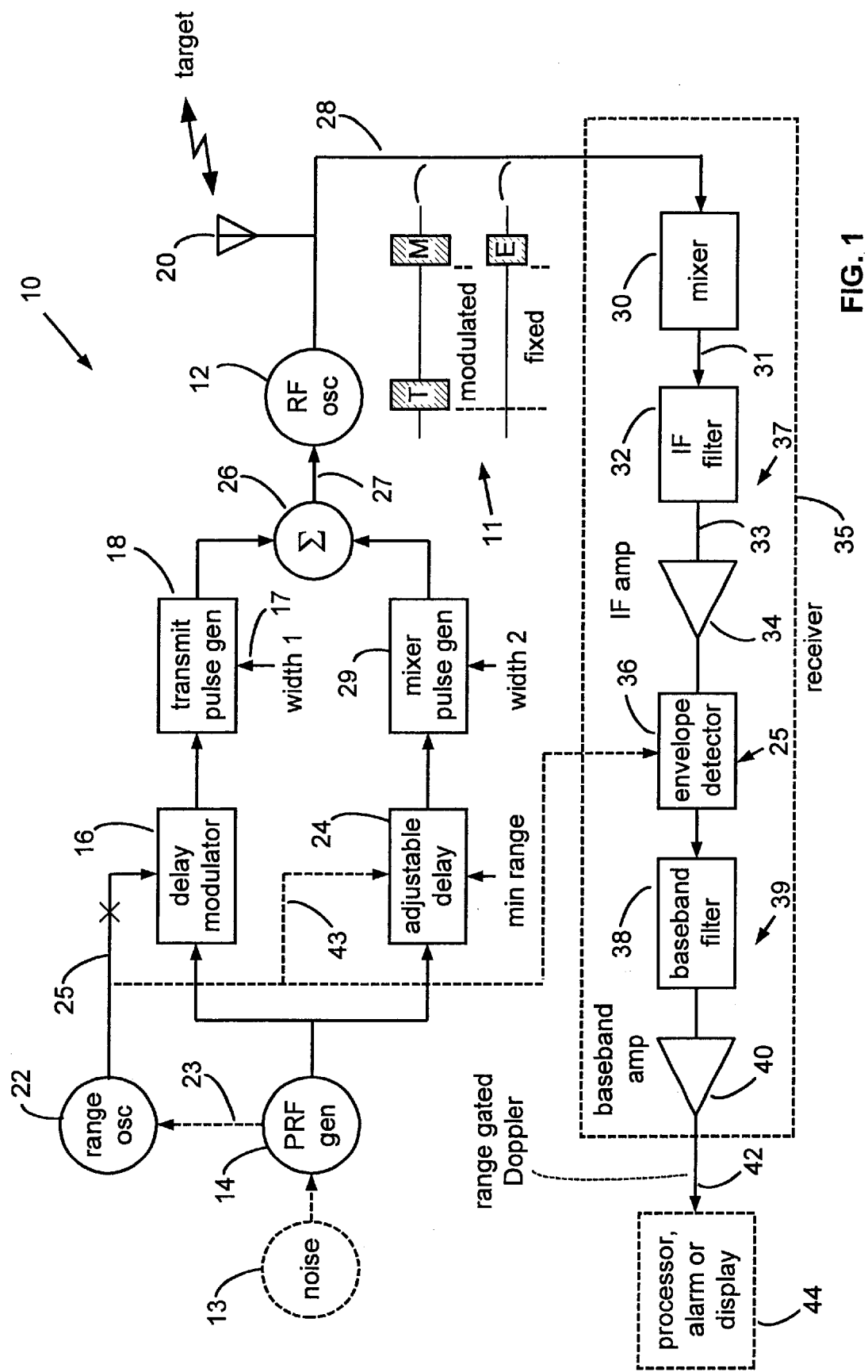
FIG. 1 is a block diagram of the modulated pulse Doppler motion sensor according to the present invention.

FIG. 1 is a block diagram of a modulated pulse Doppler sensor (or transceiver apparatus) 10 of the present invention. An RF oscillator 12 receives pulses from pulse repetition frequency (PRF) generator 14 via delay modulator 16, transmit pulse generator 18 and summation element 26, on line 27, and produces RF burst pulses (transmit pulses T) on line 28 to the transmit/receive (TX/RX) antenna 20. PRF generator 14 typically produces squarewaves at a PRF of 2 MHz that are formed into ~30 ns wide pulses by transmit pulse generator 18. Thus, the transmit pulse generator output pulses are PRF generator pulses of relatively short duration and having a modulated delay relative to the PRF generator 14. These short pulses bias-on the RF oscillator 12, which is designed to start and stop oscillating very rapidly as a function of applied bias. The oscillations are phase coherent with the drive pulses, i.e., the phase of the RF sinusoids relative to the drive pulse remains constant each time the oscillator is started-there is no significant clock-to-RF jitter.

The PRF generator 14 can be modulated in frequency or phase, or with ON-OFF gating by optional modulator (noise generator) 13 for various purposes known in the art, such as spreading the spectral lines generated by RF oscillator 12 to reduce interference to other spectrum users. The modulation may be coded to distinguish the radar signal from that of others. Pulse generator 18 can be adjusted via a "width 1" signal on width adjust line 17 to control the length of the transmit pulses, and thereby the range (in part).

A range oscillator 22 generates a waveform on line 25 at a lower frequency than the PRF for modulating delay modulator 16 at about 1 kHz. The waveshape produced by range oscillator 22 is generally a squarewave, but it may be triangular or of arbitrary shape. Range oscillator 22 may be phase locked to PRF generator 14, or it may be a divide-by-N counter with its clock input connected to the PRF generator via line 23. The amount of delay modulation provided by element 16 should be at least ¼ wavelength of the RF operating frequency of RF oscillator 12. At 915 MHz, this would amount to about ¼ nanosecond. The modulation may also span multiple RF wavelengths, but tests indicate little benefit from more than ¼ wave modulation.

RF oscillator 12 also receives pulses from PRF generator 14 via adjustable delay 24, mixer pulse generator 29 and summation element 26, on line 27, and produces mixer RF burst pulses (mixer pulses M) on line 28, which is connected to mixer 30. The duration of the mixer pulses on line 28 is generally set to be the same as the transmit RF pulses T, ~30 ns. Mixer pulse generator 29 can be adjusted by a "width 2" signal to control the length of the mixer pulses. The minimum range of sensor 10 is set by the "min range" adjustment of adjustable delay 24.

Alternatively, range oscillator 22 may modulate the delay of adjustable delay element 24 via line 43, instead of modulating delay modulator 16. This produces the same effect as modulating the transmit path with modulator 16—the relative delay between the T and M pulses is modulated in either case. The choice of modulation via element 16 or 24 is a matter of design. If modulation is implemented with element 24, then the drive to element 16 can be disconnected, as indicated by the "X" on line 25, and element 16 may function as a fixed delay, or may be deleted altogether.

Transmit pulses T, mixer pulses M, and echo pulses E received back at antenna 20 from the target are all coupled to mixer 30 on line 28. Either the T or M pulses (which may be of differing amplitude) provide adequate drive to mixer 30 to produce mixing action. Generally, the amplitude of both the T and M pulses are matched and both drive the mixer into operation. However, the echo pulses E alone are too weak to activate the mixer—only echo pulses that arrive during a T or M pulse get mixed. For close-in targets, i.e., targets having a range of ½ the duration of the T or M pulse times the speed of light, the pulses will get mixed and produce an output from the mixer. This can be called "close-in homodyning", where either the T or M pulse defines a short sensing region about the sensor and due to the short range, a region of extreme sensitivity is set up about the sensor. The homodyning region is defined by ½ the width of the transmitted or leaked mixer pulse times the speed of light. This unwanted mode is intolerable for many applications where nearby insects or vibrating panels will trigger false alarms.

Close-in homodyning is rejected as follows. The self mixing of the T or M pulse is unaffected by the modulated delay produced by delay modulator 16, since the delay modulator only affects the T-M interpulse delay, and not the pulse widths of either the T or M pulse. Thus, there is no modulation on the mixer output due to close-in homodyning.

Now this is critical to understanding this invention: the T-to-E delay is fixed while the T-to-M delay is modulated, and as a result the E-to-M delay is modulated (see the sketch 11 in FIG. 1). Accordingly, whenever the echo pulse E arrival time overlaps the M pulse, a modulated output is produced by the mixer. It is then a simple matter to filter the modulated signal, i.e., the echo E at the desired range, on line 31 from mixer 30 in IF filter 32, while rejecting the unmodulated close-in homodyning responses with the IF filter.

IF filter 32 passes modulated echo frequencies, which occur at the range oscillator 22 frequency of typically 1 kHz, while rejecting close-in homodyne Doppler responses due to nearby insects, fluttering leaves, etc, which typically have spectral components below 100 Hz. Thus, the IF filter may comprise a simple RC highpass filter having a corner above 100 Hz. The IF filter also rejects residual power supply noise and 1/f noise in the RF oscillator and mixer. The following IF amplifier 34 is configured to operate above 100 hz as well, which aids significantly in rejecting high 1/f noise seen in virtually all op amps (of which the IF amplifier is generally configured).

The output from IF filter 32 on line 33 is amplified ~60 dB by IF amp 34 and coupled to envelope detector 36, which recovers Doppler information carried on echo pulse E from moving objects within the desired sensing region. The output of mixer 30 is a carrier-like signal produced by the modulated delay of the T pulse and subsequent modulated returns from stationary objects. The carrier amplitude depends on the radar scene, and if there are no reflectors in the scene there may be no carrier until a target appears. The amplitude of the carrier is a function of the phase between the T and M pulse, which varies with both the amount of modulation delay provided by delay modulator 16 and the phase of echo pulse E relative to the M pulse, which varies with target range. The mixer output is phase sensitive since it is responsive to the product (or alternatively, the detected sum) of the sinusoidal M and E pulses. Thus, a moving target changes the IF carrier amplitude according to the Doppler effect produced by a moving target. Envelope detector 36, which in one embodiment, is controlled by the modulating signal from range oscillator 22 on line 25, recovers the Doppler modulation from the IF carrier amplitude. Baseband filter 38 connected to envelope detector 36 rejects residual IF signals and performs Doppler velocity filtering according to the needs of the application. Baseband amplifier 40 connected to baseband filter 38 conditions the filtered Doppler signal and outputs the Doppler signal on line 42. Mixer 30, IF filter 32, IF amplifier 34, envelope detector 36, baseband filter 38, and baseband amplifier 40 form receiver 35. An optional processor, alarm, or display 44 may be responsive to the Doppler signal on line 42 in a manner well known to the art. IF filter 32 and IF amplifier 34 may form a combined IF filter/amplifier 37, and baseband filter 38 and baseband amplifier 40 may form a combined baseband filter/amplifier 39.

U.S. Pat. No. 5,966,090 to McEwan discloses a multiplexing method for time-hopping the range gate over a number of ranges and multiplexing multiple receivers for each range. This channelizing technique applies equally to this invention.

FIG. 2A illustrates a two-antenna connection for transceiver 10 of FIG. 1; the rest of the system is as in FIG. 1. Two antennas, transmit TX antenna 20 connected to RF oscillator 12 and receive RX antenna 19 connected to receiver 35, allow for bi-static antenna arrangements, which can be advantageous to the formation of special antenna patterns and corresponding sensing regions, or which can be used to reduce transmitter coupling to the receiver. A portion of the RF oscillator 12 can be air-coupled to the receiver 35, as indicated by line 46. Other antenna configurations and mixer coupling networks are well known and can be applied to this configuration, for example signal splitters and circulators.

FIG. 2B is a schematic for an illustrative pulsed RF oscillator 12 of FIG. 1 which is comprised of Colpitts oscillator 48, common base buffer 50 and bandpass filter 52. Drive pulses are coupled on line 27 from summation element 26, and the RF pulse output appears on line 28. Buffer 50 is optional and serves as a load isolating element.

FIG. 2C is a schematic of an illustrative peak-to-peak RF detector mixer 30 of FIG. 1, comprised of two diodes D in a push-pull arrangement, one that conducts on the positive half of the RF cycle appearing on line 28 and the other conducting during the negative half cycle. The voltage output appearing on line 31 equals the peak-to-peak RF voltage minus two diode drops. The resistors and capacitors associated with this detector are scaled to provide peak-hold times that span more than one RF pulse repetition, and thus perform coherent integration of the individual RF pulses from one PRF generator cycle to the next, such that 2 or even 10,000 repetitions are coherently integrated for noise and interference reduction. While this is an RF envelope detector, and more particularly, an integrating peak-to-peak detector, a classic multiplying style mixer followed by a lowpass filter may also be used. Unlike a classic mixer, the peak-to-peak detector requires virtually no drive power (voltage is required, but not much current). Alternatively, conventional mixers could be used for transceiver 10 at reduced performance or greater complexity.

FIG. 2D is a schematic of an illustrative envelope detector 36, which is a sample-hold circuit driven by range oscillator 22 on line 25 to form a synchronous detector that sample-holds either the plus or minus half cycles of the IF carrier. Alternatively, envelope detector 36 may be comprised of a peak rectifier and lowpass filter, which requires no connection to range oscillator 22.

FIGS. 3A–E plot Doppler response versus target range for five prior art radar types. FIG. 3A indicates the response for a CW Doppler radar with a $1/R^2$ response and hypersensitivity at close range (near 0) and no response limit at far ranges; close-in insects and far-off trucks could produce a larger response than a desired mid-range target. FIG. 3B plots a pulse Doppler radar response. False alarms from far-off targets are completely eliminated by its range gate, which is set by the transmitted pulse width. Unfortunately, hypersensitivity at close range remains. FIG. 3C for a differential pulse Doppler shows a similar plot to FIG. 3B with a lower spread in sensitivity at close range due to a differential radar mode which differences responses for two slightly different transmitted pulse widths. The increase in sensitivity at close range is much less than seen in FIGS. 3A and 3B, but still may be too much for some applications. FIG. 3D plots the response of an impulse radar motion sensor, where the gated region is a narrow sliver defined by the width of the transmitted impulse. Security industry experts have deemed a slim sensing region to be undesirable since it lacks broad area coverage. There is also high sensitivity at close range due to self-mixing. FIG. 3E plots the response for a two-pulse Doppler radar, wherein a first pulse is transmitted and the resulting echo is mixed with a second pulse. The sensing region is defined by a near gate and a far gate, making this radar ideal for many applications—except it exhibits excessive sensitivity at near range due to close-in homodyning.

FIG. 3F plots the response for the present invention. There is no unwanted close-in response and the desired sensing region is bounded by independently adjustable near and far gates. The near gate is controlled by adjustable delay 24 (min range in FIG. 1), while the far gate is controlled by the sum of the adjustable delay, and the transmit T pulse width (width 1 in FIG. 1) and the mixer M pulse width (width 2 in FIG. 1).

Figure 4A:
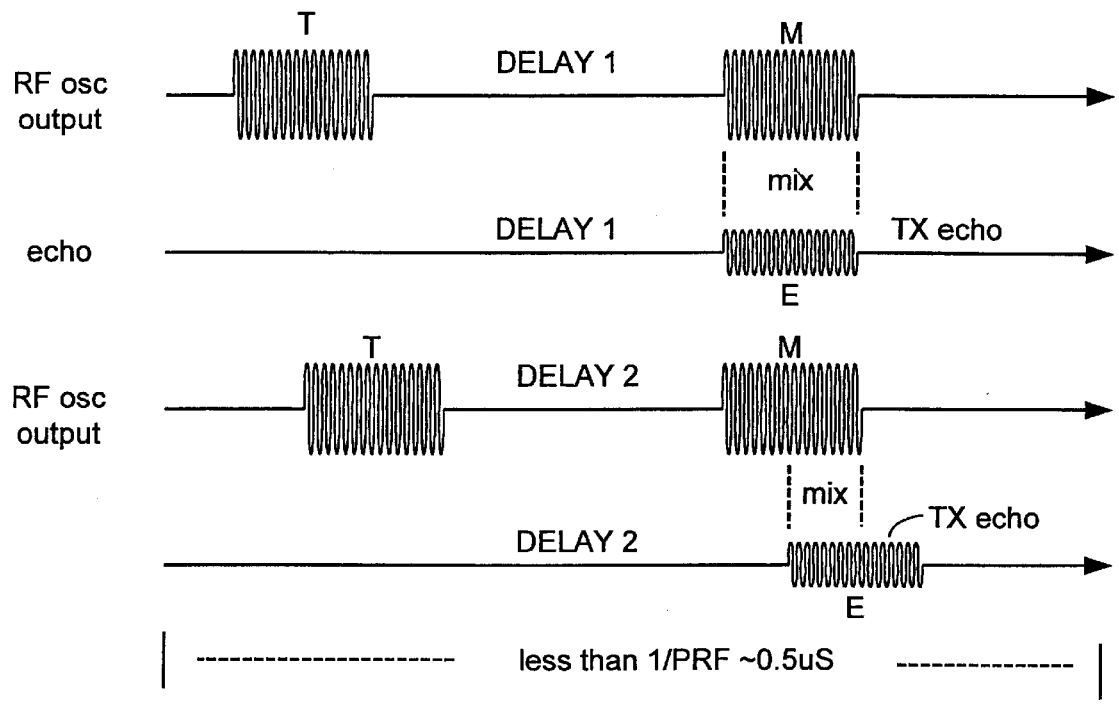
FIG. 4A is a timing diagram for the transmit, mixer and echo pulses.

FIG. 4A is a timing diagram for the RF pulses. The upper two traces, both labeled DELAY 1 show the relation between the transmit T pulse, the mixer M pulse and the echo E pulse, for a target at a range such that the E pulse returns in coincidence with the M pulse. Here the E and M pulse fully overlap and if the M pulse slides horizontally, representing target motion, a beat frequency, or Doppler signature will arise from the mixed M and E pulses. The lower pair of traces labeled DELAY 2 show the relation between the T and M pulses, where the T pulse is delayed by delay modulator 16. The magnitude of the modulated delay should be at least ¼ of an RF cycle or it may span a number of cycles as shown by the E-M offset for DELAY 2. Since the T pulse is delayed, its echo E is delayed. The M pulse remains stationary since its time is not modulated. As can be seen, the E-M pulse overlap has changed from the DELAY 1 state, so both the relative E-M phase has changed as well as the total mixing duration.

Figure 4B:
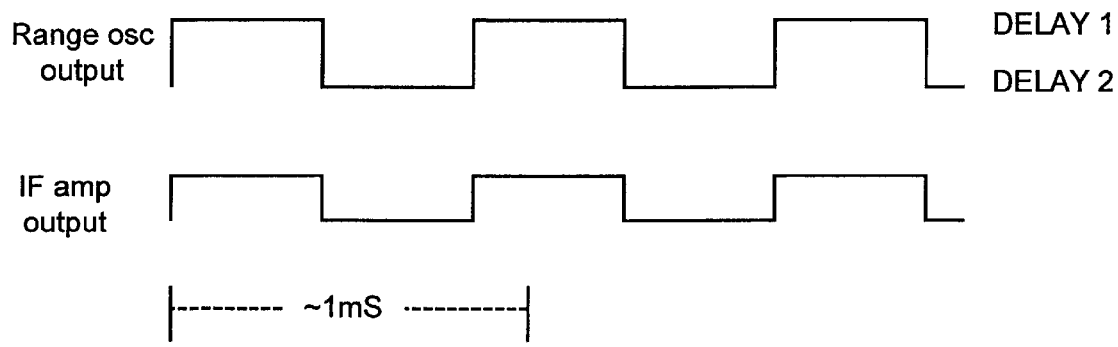
FIG. 4B is a timing diagram for the modulation signals.

Consequently the output of mixer 30 varies, according to the plot in FIG. 4B, for squarewave modulation of delay modulator 16. The trace labeled "IF amp output" is the 1 kHz carrier that becomes amplitude modulated with a Doppler signature due to target motion in the gated region. This carrier is envelope detected by envelope detector 36 to recover the Doppler signal.

Figure 5A:
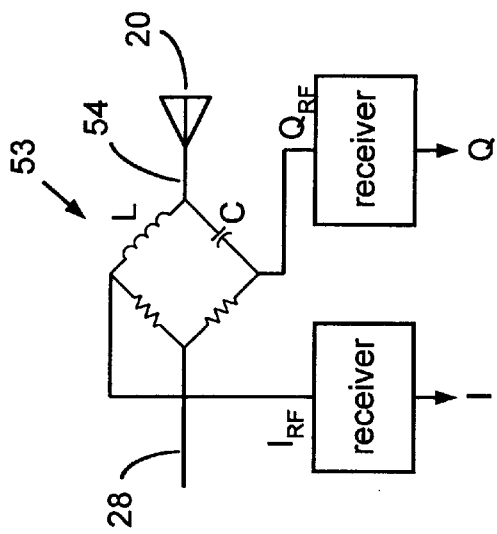
FIG. 5A depicts an RF quadrature receiver employing a delay line phasing element of the present invention.
Figure 5B:
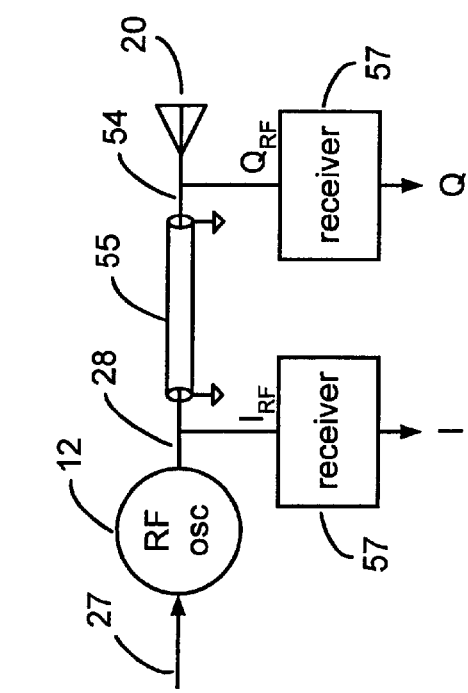
FIG. 5B depicts an RF quadrature receiver employing a lumped element phasing network of the present invention.

FIG. 5A depicts a quadrature configuration for the radar of the present invention. A phasing line 55 is inserted between line 28 from RF oscillator 12 and antenna line 54 to antenna 20 to provide in-phase RF signal, IRF, on line 28, and quadrature phase RF signal, $Q_{RF}$, on line 54, to separate receivers 57, 59 respectively, each receiver configured as receiver 35 as shown in FIG. 1. The receivers produce I and Q Doppler signals for further processing. Ideally the phasing line 55 is ⅛ wavelength long and due to 2-way travel a ¼ wavelength phase shift is realized. An alternative lumped element phasing network 53 is shown in FIG. 5B where the inductor L in the IRF branch provides a phase lead and the capacitor C provides a phase lag for the $Q_{RF}$ branch. Due to 2-way travel and two branches, each branch need only provide 22.5 degrees of shift. Over a band of about +/−10% of the RF carrier frequency, the effective $I_{RF}$ and $Q_{RF}$ phase difference remains within 2° of exact quadrature, i.e., 90°. Since the carrier frequency is maintained within 1% of its design value, an accurate 90° total phase shift is maintained.

U.S. Pat. No. 5,966,090 to McEwan discloses a quadrature RF phasing method using spaced-apart antennas having slightly different resonant frequencies to generate quadrature RF signals. This technique also applies to the present invention.

Figure 5C:
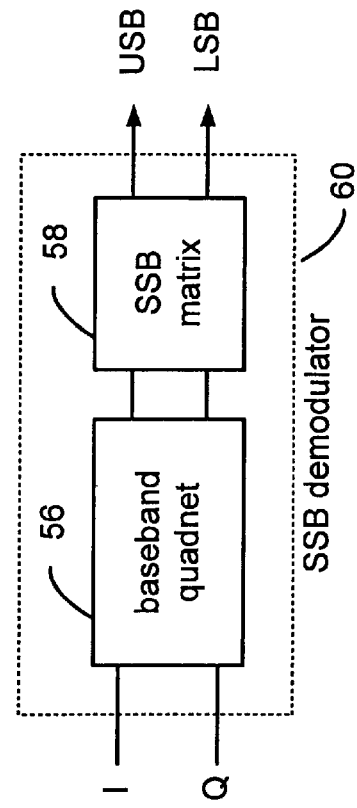
FIG. 5C is a block diagram an SSB processor of the present invention.

FIG. 5C is a block diagram of a phasing type SSB (single sideband) demodulator 60 of the present invention. It comprises a baseband quadnet 56 and an SSB matrix 58. The I and Q signals are input to the baseband quadnet 56. The baseband quadnet is generally comprised of a dual ladder of active allpass networks, which are well known in the art. The SSB matrix adds the two quadnet outputs to form the LSB (lower sideband) output, and subtracts the two quadnet channels to form the USB (upper sideband) output. This demodulator, as well as other details of quadrature radar sensor processing, is discussed more fully in U.S. patent application Ser. No. 09/388,785, "SSB Pulse Doppler Sensor and Active Reflector System," by McEwan, filed Sep. 2, 1999.

Figure 6:
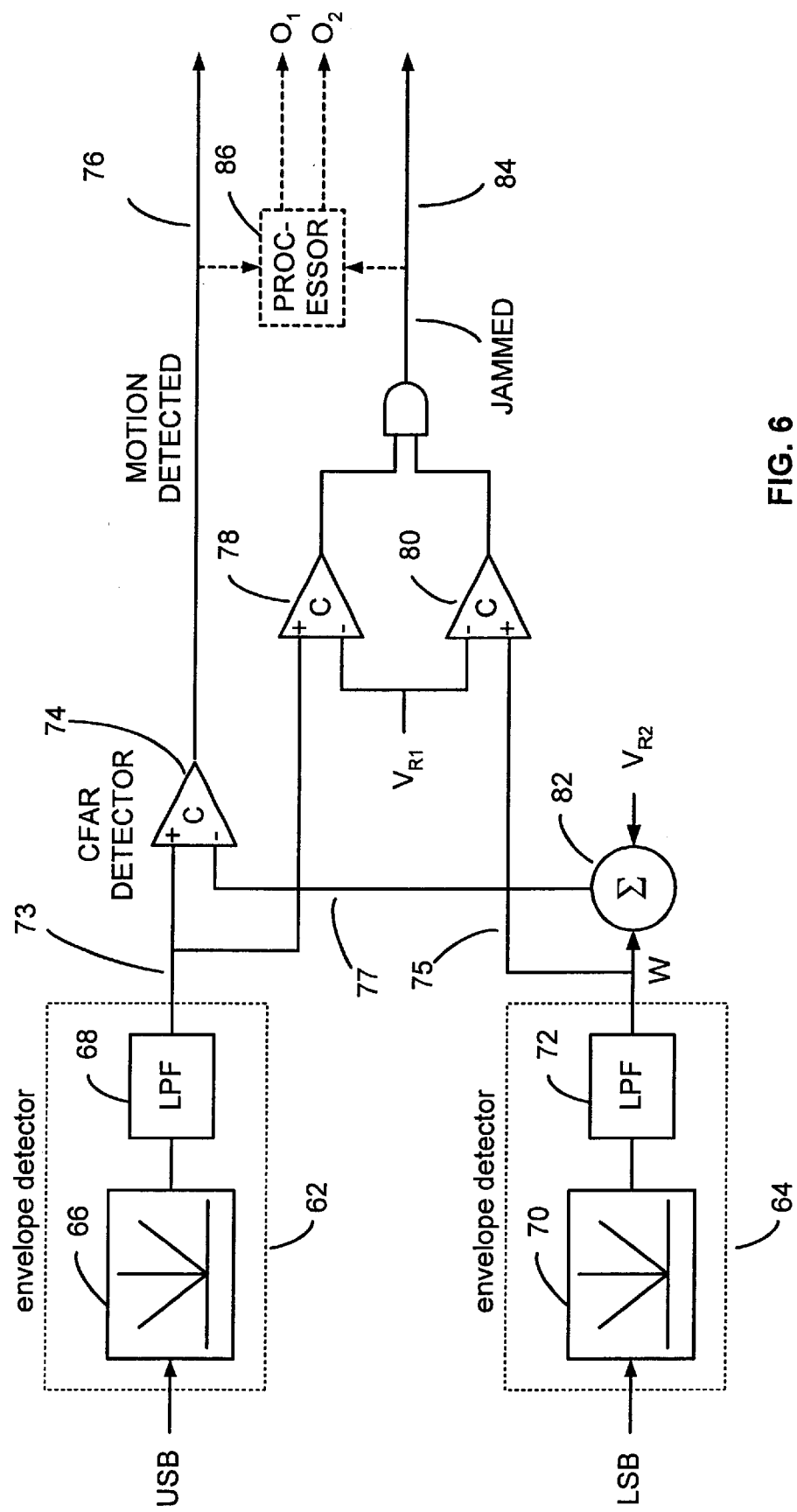
FIG. 6 is a block diagram of a CFAR detector and a jam detector of the present invention.

FIG. 6 is a block diagram of a directional motion detector, i.e., target displacement detector and a jam detector. Envelope detectors 62, 64 rectify (or square) and lowpass filter the LSB and USB signals using rectifiers or absolute value circuits 66, 70 and lowpass filters 68, 72 to provide unipolar signals produced by net inbound or outbound motion through distance, i.e., displacement of a moving object. These unipolar signals are applied to a constant false alarm rate (CFAR) detector 74, with the USB unipolar signal on line 73 applied to one input and a weighted sum from the LSB unipolar signal applied to the other input. Summation network 82 sums a reference threshold voltage $V_{R2}$ with the LSB unipolar signal on line 75 according to a weighting coefficient W. The CFAR reference voltage on line 77 scales with the fixed threshold voltage $V_{R2}$ and the weighted LSB unipolar signal. Thus, the MOTION DETECTED line 76 will not go high unless the inbound motion channel carrying the USB unipolar signal on line 73 exceeds $V_{R2}$ and any LSB unipolar signal multiplied by W. If W=10 for example, then a small amount of outbound motion will increase the threshold of the CFAR detector and inhibit inbound motion detection. Accordingly, the target must move in an inbound direction only. Nearby vibrations, fluttering leaves and buzzing insects will all cause the voltage reference to the CFAR detector to rise and thereby lower the possibility of a false trigger. If there is a concurrent outbound displacement, the CFAR threshold on line 77 will swing sharply positive due to the LSB signal—arbitrarily small amounts of a concurrent opposite displacement will prevent threshold detection by the CFAR detector. Inbound-only displacements will cause a positive voltage on line 73 that can exceed threshold $V_{R2}$, and produce a digital MOTION DETECTED indication (which may be further processed by processor 86 to control a process, etc).

RF interference will produce roughly equal noise levels in both the LSB and USB channels. For W>1, RF interference will increase the threshold to the CFAR detector and lower the probability of false triggering. A radar sensor based on this scheme will become increasingly blinded with increasing RF interference, but may never trigger a false alarm due to RF interference.

Comparators 78, 80 detect the presence of signals in the LSB and USB channels, and if both are above threshold $V_{R1}$, they will both trigger and generate a jammed indication on line 84. Above threshold signals on both the LSB and USB channels are an abnormal condition, i.e., not a target moving inbound. Processor 86 can be a display, an alarm or a signal processor having one or more outputs O1, O2 for controlling systems, i.e., vehicles, doors, etc. in response to the radar sensor.

An alternative to the directional motion detector of FIG. 6 is a digital arrangement wherein the USB and LSB channels are hard limited and then drive counters. The number of counts in the USB channel indicates the number of Doppler cycles inbound, and thus the inbound distance or displacement traversed by a moving target. The number of concurrent counts in the opposite channel, i.e., the LSB channel, indicates motion/displacement in the opposite direction. An alarm can be triggered when the number of counts in the USB channel exceeds the number in the LSB channel by a given amount. The counters may be either digital counters or charge pumps.

All descriptions herein regarding LSB and USB, and inbound and outbound motion, apply equally in the reverse sense—it is purely a matter for the practitioner and the application requirements to configure the invention to detect inbound or outbound motion.

Figure 7A:
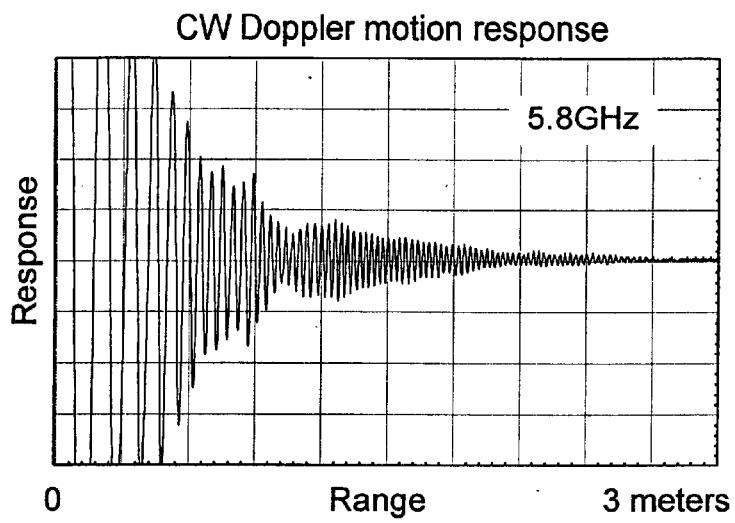
FIGS. 7A–C plot response versus range for a prior art CW Doppler radar, a prior art differential pulse Doppler radar, and a modulated pulse Doppler radar of the present invention, respectively.
Figure 7B:
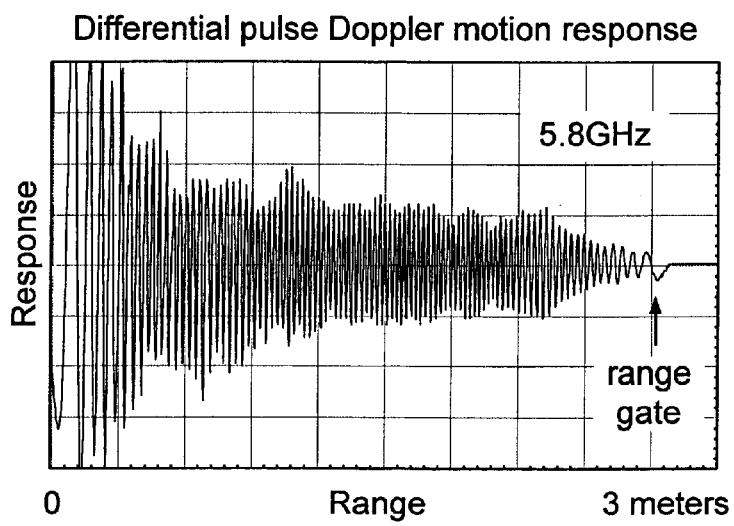

FIG. 7A plots Doppler data taken from a CW Doppler radar, and shows the $1/R^2$ dependence of the signature versus range. This plot dramatically illustrates the extreme response variation with CW Doppler radars, which include virtually all commercial radar security sensors in use today. The difference in response at 0.1 meters and at 3 meters is so great (900:1) that it cannot be shown on a linear plot. FIG. 7B plots the much-improved response of the Differential Pulse Doppler sensor, including the definite sensing limit defined by the range gate.

Figure 7C:
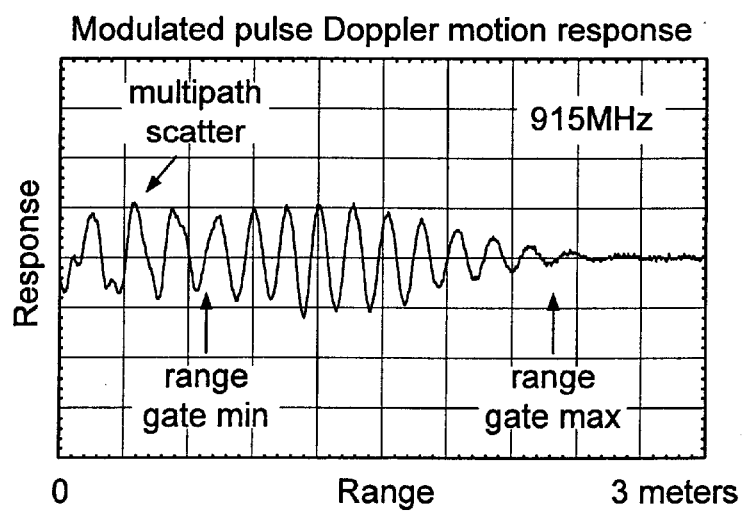

FIG. 7C plots the response of the present invention. The Doppler cycles occur at a much lower frequency since the prototype operates at 915 MHz rather than 5.8 GHz where the wavelength is 6.3 times shorter. Naturally, the apparatus could be configured for operation at other frequencies, such as 5.8 GHz. As can be seen, there is no excessive increase in sensitivity at close range, as seen in the prior art. The close-in portion of the trace labeled "multipath scatter" should show no response. However there is some response due to the use of an omni-directional 915 MHz antenna with the radar on a test bench surrounded by scattering objects. Thus, the multipath scatter is due to close-in reflections rattling back and forth and appearing as moving ghost targets in the gated region. Tests under less cluttered conditions show essentially no response at close range. This is very remarkable in view of the 900:1 response seen in FIG. 7A. The data for FIGS. 7A–C were taken with a 0.5×0.5 meter metal plate moving from less than 0.1 meters to 3 meters range.

Changes and modifications to the specifically described embodiments can be carried out without departing from the scope of the invention which is intended to be limited only by the scope of the appended claims.

What is claimed is:

1. A radar Doppler transceiver apparatus comprising:
   a PRF generator for producing a sequence of clock cycles;
   a modulated delay element connected to the PRF generator for producing a modulated delay;
   a transmit pulse generator connected to the modulated delay element for generating a transmit pulse having a modulated delay;
   an adjustable delay element connected to the PRF generator for producing an adjustable fixed delay;
   a mixer pulse generator connected to the adjustable delay element for generating a mixer pulse, the mixer pulse having an adjustable plus modulated delay relative to the transmit pulse;
   a summation circuit connected to the transmit and mixer pulse generators;
   an RF oscillator connected to the summation circuit for producing a pair of RF bursts from each clock cycle, a transmit burst and a mixer burst, the mixer burst being delayed from the transmit burst by an adjustable plus modulated delay;
   an antenna connected to the RF oscillator for transmitting the transmit burst towards a target;
   a mixer connected to the antenna for mixing reflected bursts produced by the transmit burst with the mixer burst to produce a modulated mixer signal;
   an IF filter/amplifier for rejecting unmodulated mixer outputs and amplifying modulated mixer outputs;
   an envelope detector for demodulating the modulated and amplified mixer outputs and producing a Doppler signal;
   a baseband filter/amplifier for conditioning the Doppler signal and providing a range gated Doppler signal output.

2. The apparatus of claim 1 wherein the modulated range delay is modulated periodically at a sub-multiple of the PRF.

3. The apparatus of claim 2 wherein the modulated range delay is modulated by an arbitrary waveshape.

4. The apparatus of claim 1 wherein the antenna is a single antenna employed for both transmitting and receiving, or a pair of antennas, one for transmitting and the other for receiving.

5. The apparatus of claim 1 wherein the mixer is an RF peak envelope detector, which detects and averages RF pulses from multiple clock cycles.

6. The apparatus of claim 5 wherein the RF peak envelope detector is a peak-to-peak detector.

7. The apparatus of claim 1 further comprising quadrature receivers formed of a delay line or a lumped-element phasing network having I and Q RF outputs, each connected to a receiver to produce respective I and Q baseband outputs.

8. The apparatus of claim 7 further comprising an SSB demodulator to produce USB and LSB outputs.

9. The apparatus of claim 8 further comprising a CFAR detector responsive to envelope detected USB or LSB signals, with the CFAR threshold being increased by the envelope detected LSB or LSB signals.

10. The apparatus of claim 9 further comprising a jam threshold detector responsive to the simultaneous presence of above-threshold LSB and USB signals.

11. The apparatus of claim 1 further comprising a processor connected to the range gated Doppler signal output for actuating an alarm, controlling devices, or displaying signals.

12. A short pulse radar Doppler sensor comprising:
   a pulsed RF oscillator for providing a set of first and second RF bursts, each set repeating at a PRF and having a modulated delay between the first and second bursts;
   an antenna system for transmitting RF bursts and receiving echoes of the RF bursts;
   an RF receiver responsive to modulated echoes of the first burst mixed with the second burst.

13. The sensor of claim 12 further comprising a quadrature receiver having I and Q outputs and responsive to the echoes of the first burst mixed with the second burst.

14. The sensor of claim 13 further comprising a SSB demodulator.

15. A method of radar sensing, comprising:
   generating a set of first and second RF bursts, each set repeating at a PRF and having a modulated delay between the first and second bursts;
   transmitting the first burst and receiving echoes from the transmitted burst;
   mixing the received echoes with the second burst to provide a modulated signal;
   filtering the modulated signal;
   detecting the filtered signal to provide a Doppler output from the echoes.

16. The method of claim 15 further comprising controlling the maximum sensing range by selecting the widths of the first and second bursts and the delay between the bursts.

17. The method of claim 16 further comprising quadrature mixing the received echoes with the second burst to provide I and Q modulated signals.

18. The method of claim 17 further comprising filtering the I and Q modulated signals to provide filtered I and Q signals.

19. The method of claim 18 further comprising detecting the filtered I and Q signals to provided detected I and Q signals.

20. The method of claim 19 further comprising SSB demodulating the detected I and Q signals to provide LSB and USB signals.

21. The method of claim 20 further comprising triggering a jam detector when LSB and USB signals are simultaneously present.

22. The method of claim 20 further comprising threshold triggering an alarm comparator with an integrated USB or LSB signal.

23. The method of claim 22 further comprising referencing the alarm comparator with an integrated LSB or USB signal.

24. A method of sensing SSB Doppler signals, comprising:
   generating a set of first and second RF bursts, each set repeating at a PRF and having a modulated delay between the first and second bursts;
   transmitting the first burst and receiving echoes from the transmitted burst;
   shifting the phase between the transmitted and received bursts;
   mixing the received echoes with the second burst to provide modulated signal I and Q signals;
   filtering the modulated I and Q signals to provide filtered I and Q signals;
   detecting the filtered I and Q signals to provide detected I and Q signals;
   phase shifting the detected I and Q signals to provide phase shifted I and Q baseband signals;
   algebraically summing the phase shifted baseband I and Q signals to form LSB and USB signals.

25. The method of claim 24 wherein the mixed signals from mixing the received echoes with the second burst are integrated over multiple repetitions at the PRF.

26. The method of claim 25 further comprising threshold triggering a jam signal when LSB and USB signals are simultaneously present.

27. A method of sensing radar target displacement, comprising:
   transmitting a set of first and second RF bursts, each set repeating at a PRF and having a modulated delay between the first and second bursts;
   mixing echoes from the first burst with the second burst to form modulated I and Q signals;
   processing the modulated I and Q signals to form USB and LSB signals that represent respective inbound and outbound motion;
   envelope detecting the USB and LSB signals to form envelope detected USB and LSB signals;
   weighting the envelope detected LSB signal relative to the envelope detected USB signal to provide weighted USB and LSB signals;
   threshold detecting the weighted USB or LSB signal relative to the weighted LSB or USB signal to provide a detection signal for a defined amount of target movement in a given direction.

28. The method of claim 27 further comprising triggering a jam signal when LSB and USB signals are simultaneously present.

* * * * *